P. SCHROEDTER.
INVERTED INCANDESCENT GAS BURNER.
APPLICATION FILED APR. 26, 1912.
1,070,544.
Patented Aug. 19, 1913.
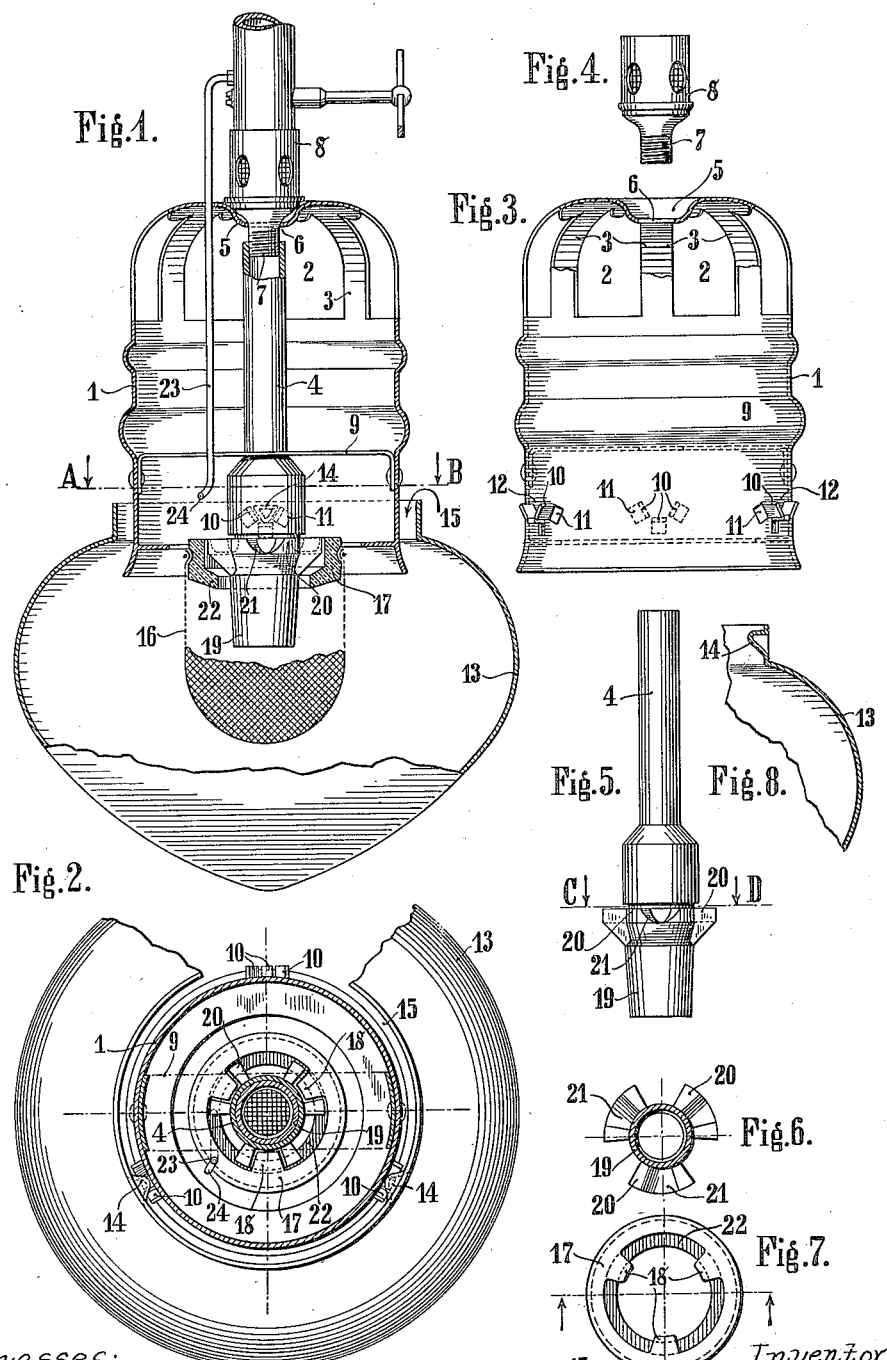

UNITED STATES PATENT OFFICE.

PAUL SCHROEDTER, OF BERLIN, GERMANY.

INVERTED INCANDESCENT GAS-BURNER.

1,070,544.　　　　Specification of Letters Patent.　　Patented Aug. 19, 1913.

Application filed April 26, 1912. Serial No. 693,303.

*To all whom it may concern:*

Be it known that I, PAUL SCHROEDTER, merchant, a subject of the Emperor of Germany, residing in Berlin, Germany, have invented certain new and useful Improvements in Inverted Incandescent Gas-Burners, of which the following is a specification.

This invention relates to a burner for inverted incandescent gas light with a bell or dome shaped casing, from which the glass shade is so suspended that it engages the casing from the outside, while the suspension of the incandescent mantle from the burner nozzle is very simple and suitable; a by-flame, which, avoids hitherto known drawbacks, being further provided on the burner.

The accompanying drawing shows the improved burner.

Figure 1 is a vertical central section through same, Fig. 2 is a cross-sectional plan of same on the line A—B of Fig. 1, Fig. 3 is a side view, partly in section, of the bell-shaped burner casing with the supports for the shade, Fig. 4 is a side view of the mixing chamber which is screwed on the gas supply pipe, Fig. 5 is a side view of the burner tube with the nozzle, Fig. 6 is a section on the line C—D of Fig. 5, showing thus a plan view of the burner nozzle, Figs. 7 and 7ª show, respectively in a plan view and cross section, the annular holder for the mantle, and Fig. 8 is a fragmentary vertical section through the upper part of the glass shade.

The burner casing 1 has the shape of a bell or dome with cutout portions 2 in its upper part, so that proportionately thin stays 3 are left between the latter. Thereby, a certain spring action is obtained in such a way that at a pressure from above the roof of the bell can somewhat yield. These openings also permit of the radiation of the heat generated by the light. This circumstance is used for an extraordinarily simple attachment of the burner tube 4. For this purpose, the top of the bell-shaped burner casing is provided with a central depression 5, in the base of which the hole 6 for the passage of the nipple 7 of the mixing chamber 8 is arranged. The mixing chamber is brought into the position shown in Fig. 1, that is, the nipple 7 engaging in the hole 6, whereupon the burner tube 4 is passed up through a central hole in a bridge 9 extending transversely of and secured at its ends to the burner casing, and the tube screwed from outside over the screw-threads of the nipple 7. As the burner tube is screwed upon the mixing chamber an annular shoulder on said tube engages with the bottom of the bridge 9 tending to draw the top of the bell downward, clamping the casing between said shoulder and the mixing chamber, and as the top of the bell has a certain springy or yielding action due to the openings therein, a very rigid connection of the burner tube is obtained and said tube maintained in its central position by the engagement thereof in the openings of the bridge 9 and the nozzle 8 in the opening in the depression 5.

Adjacent its lower end the burner casing is provided with laterally projecting supports for a globe or shade 13. These supports in the present instance are located at three points in the circumference of the casing and consist of flaps 10, stamped or pressed out from the casing proper leaving openings 11 in the latter, and the flaps are bent up to form substantially V-shaped supports. The globe is placed in position from below the casing to engage outside thereof instead of inside the casing as is the usual practice, and has inwardly extending projections 14 to engage in the V-shaped supports thereby providing an extremely simple and safe mounting for the globe. By this construction there will be an annular space 15 between the globe and burner casing to permit of the entrance of the combustion air. Furthermore, by this construction the necessity of a chimney or draft glass is obviated even should the globe be entirely closed at the bottom.

While the supports 12 are preferably pressed out from the walls of the casing as above set forth, it will be obvious that the same can be constructed separately and soldered or riveted thereto. Also, that while the V-shape of said supports is very suitable since the glass globe can thereby practically be immovably suspended therefrom, they may be modified in any way to suit any other requirements.

To carry the incandescent mantle 16 I provide an annular holder 17 having inwardly extending projections 18. The burner nozzle 19 is provided with laterally extending projections 20 having grooves 21 in the top. The mantle carrier 17 is placed on the burner nozzle from below so that the projections 18 on said carrier pass between the nozzle projections 20 whereupon the holder, which is similar to a bayonet closure, is turned until the projections 18 thereon engage in the grooves 21 in the nozzle projections 20 when the holder is firmly attached to the burner nozzle. The lower end of the mantle holder has an inwardly extending annular flange 22 to prevent the holder from being shifted up too high with the consequent result of damaging the mantle when placing the same on the burner. My improved burner is also provided with a pilot light or by-flame 23 so located that the outlet orifice 24 is within the burner casing but above the incandescent mantle, whereby the incandescent mantle is prevented from being damaged by the slight explosions which occur when the by-flame is lighted, which frequently occurs in the use of pilot lights in connection with inverted gas mantles.

I claim:

1. An incandescent gas lamp, comprising in combination a dome-shaped burner casing having cutout portions near its top to provide a yielding structure; a central depression in the top of said casing with an opening therein; a mixing chamber to engage in said depression and having a portion to pass through the opening therein; a bridge extending transversely of the casing having a central opening therein; and a burner tube adapted to pass through the bridge opening and to have screw threaded connection with the mixing chamber, said tube having a shoulder to engage with the bottom of the bridge, substantially as and for the purpose specified.

2. The combination in an incandescent gas lamp, of a dome-shaped burner casing, and globe supports stamped out and projecting laterally from said casing near the lower end, each of said supports comprising three flaps to provide substantially V-shaped supports.

3. An incandescent gas lamp, comprising in combination a burner casing; globe supports comprising flaps pressed out laterally from the casing and bent up substantially in V-shape; and a globe into which the casing is adapted to extend having inwardly extending projections to engage in the V-shaped portion of the globe supports on the casing, substantially as and for the purpose specified.

In witness whereof I have hereunto signed my name this 11th day of April 1912, in the presence of two subscribing witnesses.

PAUL SCHROEDTER.

Witnesses:
WOLDEMAR HAUPT,
HENRY HASPER.

---

Copies of this patent may be obtained for five cents each, by addressing the "Commissioner of Patents, Washington, D. C."